US011391341B2

(12) United States Patent
Sawada (10) Patent No.: US 11,391,341 B2
(45) Date of Patent: Jul. 19, 2022

(54) BALANCER DEVICE FOR INTERNAL COMBUSTION ENGINES

(71) Applicant: HITACHI AUTOMOTIVE SYSTEMS, LTD., Hitachinaka (JP)

(72) Inventor: Masashi Sawada, Kasugai (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 16/977,952

(22) PCT Filed: Jan. 15, 2019

(86) PCT No.: PCT/JP2019/000818
§ 371 (c)(1),
(2) Date: Sep. 3, 2020

(87) PCT Pub. No.: WO2019/171759
PCT Pub. Date: Sep. 12, 2019

(65) Prior Publication Data
US 2021/0048087 A1      Feb. 18, 2021

(30) Foreign Application Priority Data
Mar. 7, 2018   (JP) .............................. JP2018-040589

(51) Int. Cl.
*F01M 1/02*       (2006.01)
*F16F 15/26*      (2006.01)
(52) U.S. Cl.
CPC ............. *F16F 15/262* (2013.01); *F01M 1/02* (2013.01); *F01M 2001/0276* (2013.01)
(58) Field of Classification Search
CPC ............. F01M 1/02; F01M 2001/0276; F01M 2001/0269; F01M 2001/0238;
(Continued)

(56) References Cited

U.S. PATENT DOCUMENTS 4,703,724 A * 11/1987 Candea ..................... F01M 1/02
                                                        123/192.2
4,766,857 A *  8/1988 Laine ..................... F16F 15/265
                                                        123/192.2
(Continued)

FOREIGN PATENT DOCUMENTS

CN      206918161 U  *  1/2018
JP      2010-190407 A    9/2010
(Continued)

OTHER PUBLICATIONS

Description WO2017141917A1—English translation (Year: 2017).*
(Continued)

*Primary Examiner* — George C Jin
*Assistant Examiner* — Teuta B Holbrook
(74) *Attorney, Agent, or Firm* — Foley & Lardner LLP (57) ABSTRACT

Disclosed is a balancer device for an internal combustion engine, wherein: a pump mounting fixing part to which an oil pump is fixed is formed on an end surface of a lower housing member; a gear accommodation part in which a pump driving gear and a reduction gear are accommodated is provided between the oil pump and the pump mounting fixing part; a rigidity-reinforcing part in which an oil discharge passage is defined in communication with a discharge port of the oil pump is formed on the lower housing member so as to extend in a direction of extension of first and second balancer shafts on an outer side of the lower housing member; and a portion of the pump mounting fixing part formed on the end surface of the lower housing member and the rigidity-reinforcing part are made integral with each other.

12 Claims, 9 Drawing Sheets

(58) Field of Classification Search
CPC ............ F01M 2011/0079; F16F 15/265; F16F 15/264; F16F 15/26; F16F 15/262; Y10T 74/2185; F02F 7/00; F16H 57/0441
See application file for complete search history.

(56) References Cited

U.S. PATENT DOCUMENTS

| | | | | |
|---|---|---|---|---|
| 5,535,643 | A * | 7/1996 | Garza | F02B 67/04 123/192.2 |
| 5,788,381 | A * | 8/1998 | Yamazaki | F16C 33/1085 123/192.2 |
| 8,100,105 | B2 * | 1/2012 | Schober | F16F 15/264 123/192.2 |
| 2005/0268877 | A1 * | 12/2005 | Hashimoto | F16F 15/267 123/192.2 |
| 2009/0038575 | A1 * | 2/2009 | Ohsawa | F16F 15/265 123/192.2 |
| 2011/0168125 | A1 * | 7/2011 | Momosaki | F01M 1/02 123/196 R |
| 2011/0308492 | A1 * | 12/2011 | Nishi | F01M 1/02 123/192.2 |
| 2018/0163816 | A1 | 6/2018 | Kitamura | |
| 2019/0345852 | A1 * | 11/2019 | Kato | F01M 1/02 |

FOREIGN PATENT DOCUMENTS

| | | | |
|---|---|---|---|
| JP | 2016-223477 A | 12/2016 | |
| WO | WO-2017/141917 A1 | 8/2017 | |
| WO | WO-2017141917 A1 * | 8/2017 | ............ F16F 15/262 |

OTHER PUBLICATIONS

International Search Report issued in corresponding application No. PCT/JP2019/000818 dated Mar. 19, 2019 with English translation.
Written Opinion issued in corresponding application No. PCT/JP2019/000818 dated Mar. 19, 2019 with English translation.

* cited by examiner

BALANCER DEVICE FOR INTERNAL COMBUSTION ENGINES

FIELD OF THE INVENTION

The present invention relates to a balancer device for an internal combustion engine, and more particularly, to a balancer device for an internal combustion engine having an oil pump.

BACKGROUND ART

In a multi-cylinder internal combustion engine, there is used an internal combustion engine balancer device (hereinafter simply referred to as a balancer device) of the type having a first balancer shaft rotationally driven by a crankshaft and a second balancer shaft rotationally driven by the first balancer shaft such that a secondary vibration of the internal combustion engine is reduced by the balancer device. More specifically, the first and second balancer shafts are equipped with respective balancer weights. These first and second balancer shafts are allowed to rotate at a speed twice the rotation speed of the crankshaft and cause vibrations thereof opposite in phase to the secondary vibration of the multi-cylinder internal combustion engine, whereby the vibration of the internal combustion engine is reduced.

Further, Japanese Laid-Open Patent Publication No. 2016-223477 (Patent Document 1) discloses that the balancer device is arranged in an oil pan by being fastened to a lower side of the internal combustion engine body in a gravity direction Y1, and is configured to, in conjunction with rotation driving of the first balancer shaft by the crankshaft and rotation driving of the second balancer shaft by the first balancer shaft through a synchronization transmission gear, drive an oil pump by a reduction gear mounted to the second balancer shaft and a pump driving gear held in mesh with the reduction gear.

PRIOR ART DOCUMENTS

Patent Document

Patent Document 1: Japanese Laid-Open Patent Publication No. 2016-223477

SUMMARY OF THE INVENTION

Problem to be Solved by the Invention

The above-described conventional balancer device has the following problem. The oil pump is fixed by bolts at a position adjacent to the balancer device. On the other hand, a pump section of the oil pump is heavy in weight and is in a free state without being fixed to another structural member. Thus, the mesh state of the reduction gear mounted to the second balancer shaft and the pump driving gear mounted to the rotation shaft of the oil pump varies due to vibrations caused by the balancer weights. This results in large gear mesh noise.

It is accordingly an object of the present invention to provide a balancer device for an internal combustion engine, capable of achieving smooth mesh between a reduction gear mounted to a balancer shaft and a pump driving gear mounted to a rotation shaft of an oil pump so as to suppress the occurrence of gear mesh noise.

Means for Solving the Problems

According to one aspect of the present invention, there is provided a balancer device for an internal combustion engine, wherein: a pump mounting fixing part to which an oil pump is fixed is formed on an end surface of a lower housing member; a gear accommodating part in which a pump driving gear and a reduction gear are accommodated is provided between the oil pump and the pump mounting fixing part; a rigidity-reinforcing part in which an oil discharge passage is defined in communication with a discharge port of the oil pump is formed on the lower housing member so as to extend in a direction of extension of first and second balancer shafts on an outer side of the lower housing member; and a portion of the pump mounting fixing part formed on the end surface of the lower housing member and the rigidity-reinforcing part are made integral with each other.

Effects of the Invention

The present invention provides the effect of suppressing mesh noise between the reduction gear and the pump driving gear.

DESCRIPTION OF EMBODIMENTS

Hereinafter, embodiments of the present invention will be described in detail below with reference to the drawings. It should be understood that: the present invention is not limited to the following embodiments; and various changes and modifications of the following embodiments are possible within the technical scope of the present invention.

Before addressing the embodiments of the present invention, the installation state of an internal combustion engine with a balancer device will be first explained below with reference to FIG. 1.

Figure 1:
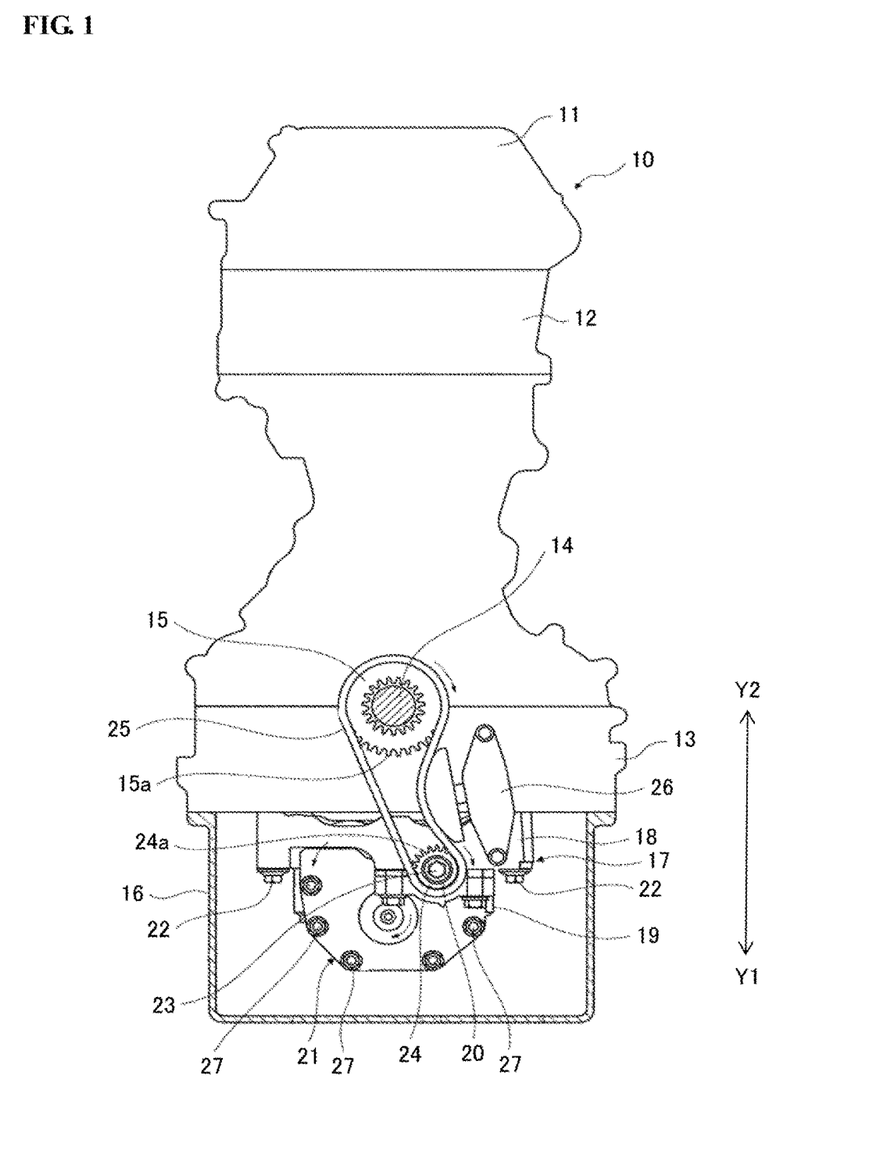
FIG. 1 is a cross-sectional view of an internal combustion engine to which a balancer device is mounted.

FIG. 1 is an elevation view of the internal combustion engine 10. The internal combustion engine 10 is designed as, for example, an in-line four-cylinder reciprocating engine and is mounted to a front-engine/front-drive vehicle (so called a FF vehicle). In this engine, a cylinder block 12 is disposed on a lower side of a cylinder head 11 in a gravity direction Y1. A ladder frame 13 is fixed to a lower side of the cylinder block 12 in the gravity direction Y1. A crankshaft 14 is rotatably supported on the ladder frame 13. Four cylinders of the engine are arranged in line along the crankshaft 14. Two of the four cylinders on both end sides with respect to the axis of the crankshaft 14 have pistons operated in the same direction, whereas two others of the four cylinders have pistons operated in a direction opposite to that of the two end-side cylinders. Since the speed at which the pistons move toward the top dead center and the speed at which the pistons move toward the bottom dead center are different, a secondary vibration occurs in the internal combustion engine 10 by operations of the pistons in the respective cylinders.

The internal combustion engine 10 is mounted to the vehicle such that the crankshaft 14 is arranged in a left-right direction with respect to a front-rear direction of the vehicle body. An engine-side gear 15 is mounted to one axial end of the crankshaft 14. A gear portion 15a is formed on an outer circumference of the engine-side gear 15. An oil pan 16 in which engine oil is stored is attached to a lower side of the ladder frame 13 in the gravity direction Y1. The balancer device 17 is arranged in the oil pan 16 to suppress a secondary vibration of the internal combustion engine 10.

The balancer device 17 includes an upper housing member 18 which is a crankcase, a lower housing member 19, a driving unit 20 and an oil pump 21. The upper housing member 18 is located in a direction Y2 opposite to the gravity direction Y1 with respect to a mating surface 189 between the upper housing member 18 and the lower housing member 19, whereas the lower housing member 19 is located in the gravity direction Y1 with respect to the mating surface 189. These upper and lower housing members 18 and 19 are fixed by a plurality of fastening bolts 22 to the lower side of the ladder frame 13 in the gravity direction Y1. The driving unit 20 is adapted to receive a rotational force from the crankshaft 14. A balancer driving sprocket (chain driving part) 24 as a balancer driving gear is fixed by a sprocket fastening bolt 23 to the driving unit 20.

A gear portion 24a is formed on an outer circumference of the balancer driving sprocket 24. The number of teeth of the gear portion 24a is set to half the number of teeth of the gear portion 15a. A driving chain 25 is wound on the balancer driving sprocket 24 and the engine-side gear 15. Thus, the torque (rotational force) from the crankshaft 14 is transmitted to the driving unit 20 through the driving chain 25. A constant tension is being applied to the driving chain 25 at all times by means of e.g. a hydraulic tensioner 26. The tensioner 26 is supported on the ladder frame 13 and the upper housing member 18. Since the driving unit 20 is chain-driven as mentioned above, the rotation speed of the crankshaft 4 is changed (i.e. increased twice) and transmitted to the driving unit 20 which is located away from the crankshaft 14. Such a chain-driven system is advantageous in terms of downsizing as compared to a gear-driven system.

The balancer device 17 is an oil pump-equipped balancer device in which the oil pump 21 is provided adjacent to and connected to the balancer body. The oil pump 21 is in the form of a trochoid pump and is fixed to the lower housing member 19 by a plurality of fastening bolts 27. The oil pump 21 may be a variable displacement oil pump having a pump chamber whose capacity change amount varies according to operating conditions. As the variable displacement oil pump, usable is a known vane pump or trochoid pump equipped with a mechanism for decreasing the capacity change amount of the pump chamber during high-rotation-speed operation of the pump.

Herein, a conventional balancer device is so structured that oil suction and discharge ports of an oil pump are arranged in a direction perpendicular to an axis of a balancer shaft (i.e. arranged in a radial direction). The oil discharge port is connected to a separately provided discharge passage such as pipe such that oil discharged from the discharge port is supplied to equipment and parts where lubrication or cooling is required. For this reason, the conventional balancer device has the problem that the oil pump becomes large in size in the radial outward direction.

The balancer device for the internal combustion engine according to one embodiment of the present invention will be next explained below. The one embodiment of the present invention is shown in FIGS. 2 to 9. A detained explanation will be given of the one embodiment of the present invention with reference to these figures.

Figure 2:
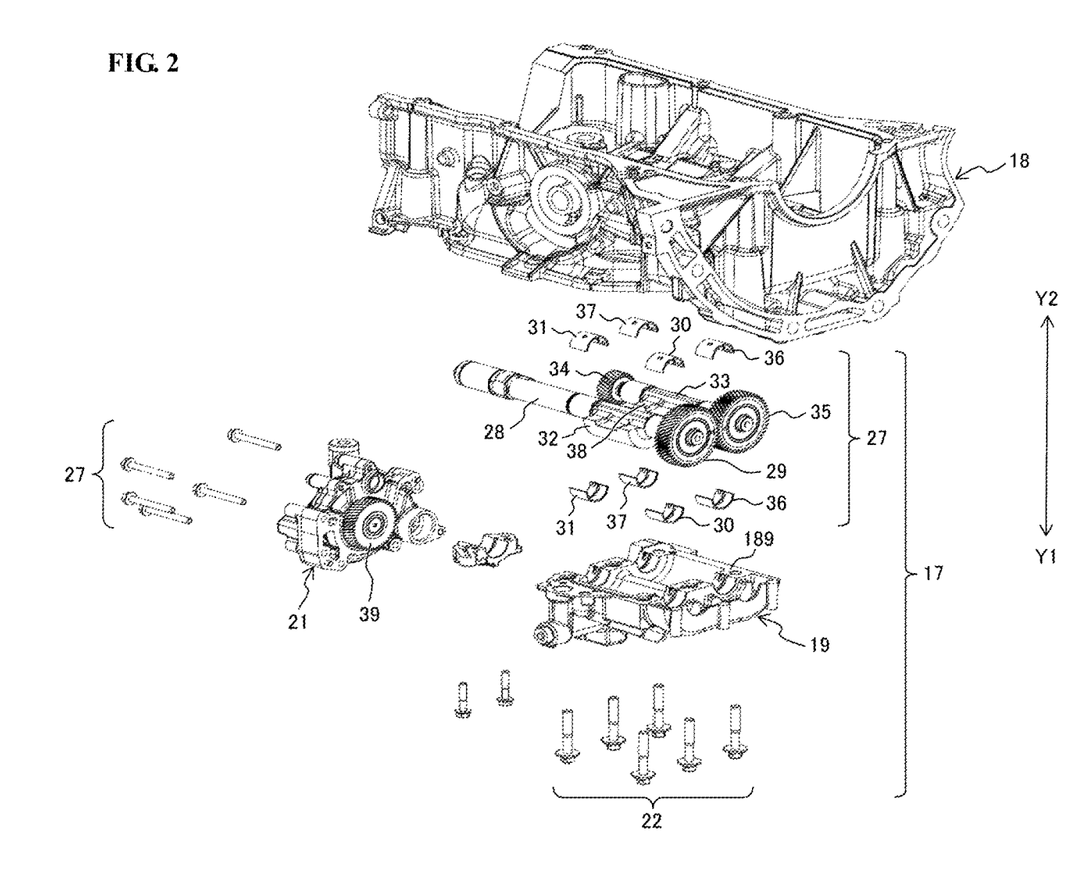
FIG. 2 is an exploded perspective view of a balancer device according to one embodiment of the present invention.

FIG. 2 is an exploded perspective view of the balancer device 17. As shown in FIG. 2, the balancer device 17 is disposed in an accommodation space defined by the lower housing member 19 and the crankcase (upper housing member) 18 so as to suppress a secondary vibration of the internal combustion engine. The oil pump 21 is fixed by the fastening bolts 27 to one end surface of the lower housing member 19 in an axis direction of balancer shafts 28 and 33.

Although the upper housing member 18 is configured as the crankcase in the present embodiment, the upper housing member 18 may be provided as a separate housing member from the crankcase and fixed to the lower side of the ladder frame 13 in the gravity direction Y1.

The balancer device 17 has a first rotation system equipped with a balancer weight, a second rotation system equipped with a balancer device and a gear transmission mechanism that reverses rotation of the first rotation system and applies the reverse rotation to the second rotation system. By the rotations of the first and second rotation systems, the balancer device cancels a vibration in a lateral direction that passes through the rotation axes of the first and second balancer shafts 28 and 33 and generates a vibratory force in a vertical direction perpendicular to a plane that passes through the rotation axes of the first and second balancer shafts 28 and 33 (i.e. in a direction along the gravity direction Y1). Further, the first and second rotation systems rotates at a speed twice the rotation speed of the crankshaft. The vibratory force generated by the balancer device is thus opposite in phase to a secondary component of the vibratory force of the internal combustion engine caused by reciprocating motions of the multiple pistons, whereby the vibration of the internal combustion engine is reduced.

The first rotation system contains: the balancer driving sprocket 24 (see FIG. 1) as the balancer driving gear and a first transmission gear 29 respectively fixed to opposite ends of the first balancer shaft 28; rear- and front-side first bearings 30 and 31 for rotatably supporting the first balancer shaft 28; and the first balancer weight 32 mounted to the first balancer shaft 28. The balancer driving sprocket 24 fixed to one end of the first balancer shaft 28 allows transmission of the rotational force from the crankshaft 14 to the first balancer shaft 28 through the driving chain 25. It is alternatively feasible to bring the balancer driving bear into direct mesh with a gear fixed to the crankshaft and thereby transmit the rotational force from the crankshaft 14 to the first balancer shaft 28 through such direct mesh between the balancer driving bear and the gear fixed to the crankshaft.

The first transmission gear 29 fixed to the other end of the first balancer shaft 28 is in the form of a helical gear having teeth slanted relative to a rotation axis thereof. The first transmission gear 29 is rotatably disposed in the accommodation space between the lower housing member 19 and the crankcase 18. The rear-side first bearing 30 and the front-side first bearing 31 are fixed and supported between the lower housing member 19 and the lower surface of the crankcase 18 such that the first balancer shaft 29 is rotatably supported by these bearings 30 and 31.

On the other hand, the second rotation system contains: a reduction gear 34 and a second transmission gear 35 respectively fixed to opposite ends of the second balancer shaft 33; rear- and front-side second bearings 36 and 37 for rotatably supporting the second balancer shaft 33; and the second balancer weight 38 mounted to the second balancer shaft 33. The reduction gear 34 is in mesh with a pump driving gear 39, which is fixed to a rotation shaft of the oil pump 21, so as to cause rotation of the pump driving gear 39. As in the case of the first transmission gear 29, the second transmission gear 35 is in the form of a helical gear having teeth slanted relative to a rotation axis thereof. The second transmission gear 35 is in mesh with the first transmission gear 29 so as to rotate in a direction opposite to the first balancer shaft 28 upon transmission of the rotational force from the first transmission gear 29.

The reduction gear 34 and the second transmission gear 35 are rotatably disposed in the accommodation space between the lower housing member 19 and the lower surface of the crankcase 18. The first and second transmission gears 29 and 35 are in helical gear mesh with each other so as to allow an increase of contact area and thereby reduce an unusual noise and vibration, but apply a force to the first and second balancer shafts 28 and 33 in their rotation axis directions. As in the case of the first and second transmission gears 29 and 35, each of the reduction gear 34 and the pump driving gear 39 are respectively in the form of helical gears having teeth slanted relative to rotation axes thereof. These gears 34 and 39 are also in helical mar mesh with each other so as to a unusual noise and vibration, but apply a force to the second balancer shaft 33 and the rotation shaft of the oil pump 21 in their rotation axis directions.

Consequently, a thrust force is exerted on the balancer shaft in the rotation axis direction due to a component of force caused by the helical gears when the first and second balancer shafts 28 and 33 rotate. By contact of the first and second balancer shafts 28 and 33 with the axial end surface of the accommodation space between the lower housing member 19 and the crankcase 18, however, the first and second balancer shafts 28 and 33 are prevented from moving in their respective rotation axis directions.

The rear-side second bearing 36 and the front-side second bearing 37 are fixed and supported between the lower housing member 19 and the lower surface of the crankcase 18 such that the second balancer shaft 33 is rotatably supported by these bearings 36 and 37.

As will be explained in detail later, a gear accommodating recessed part (not specifically shown) is formed integrally on the oil pump 21-side end surface of the lower housing member 19 such that the reduction gear 34 and the pump driving gear 39 are placed in the gear accommodating recessed part. Hence, the gear accommodating recessed part defines with the after-mentioned pump cover a gear accommodation part in which the reduction gear 34 and the pump driving gear 39 are accommodated. The configuration of the gear accommodation part will also be explained in detail later. In the present embodiment, the gear accommodating recessed part has the function of a "pump mounting fixing part" for the oil pump 21 so that that the pump cover of the oil pump 21 is fixed to the gear accommodating recessed part.

With rotation of the engine-side gear 15 (see FIG. 1) fixed to the crankshaft which is arranged above an upper side of the balancer device 17 in the direction Y2 opposite to the gravity direction, the balancer driving sprocket 24 (see FIG. 1) rotates at a speed twice the rotation speed of the engine-side gear. Then, the first balancer shaft 28 to which the balancer driving sprocket 24 is fixed rotates. The second transmission gear 35, which is in mesh with the first transmission gear 29 fixed to the first balancer shaft 28, also rotates to cause the second balancer shaft 33, which has been phase-adjusted relative to the first balancer shaft 28, to rotate together therewith in an opposite direction to that of the first balancer shaft 29. By such opposite rotations of the first and second balancer shafts, the vibration in the lateral direction passing through the rotation axes of the first and second balancer shaft 28 and 33 is cancelled; and the vibratory force is generated in the vertical direction perpendicular to the plane passing through the rotation axes of the first and second balancer shafts 28 and 33 (i.e. in the direction along the gravity direction Y1).

As explained above, the balancer device 17 is configured to reduce a vibration of the internal combustion engine by generating a vibratory force opposite in phase to a secondary component of the vibratory force of the internal combustion engine caused by reciprocating motions of the pistons. This type of balancer device 17 is well known.

Figure 3:
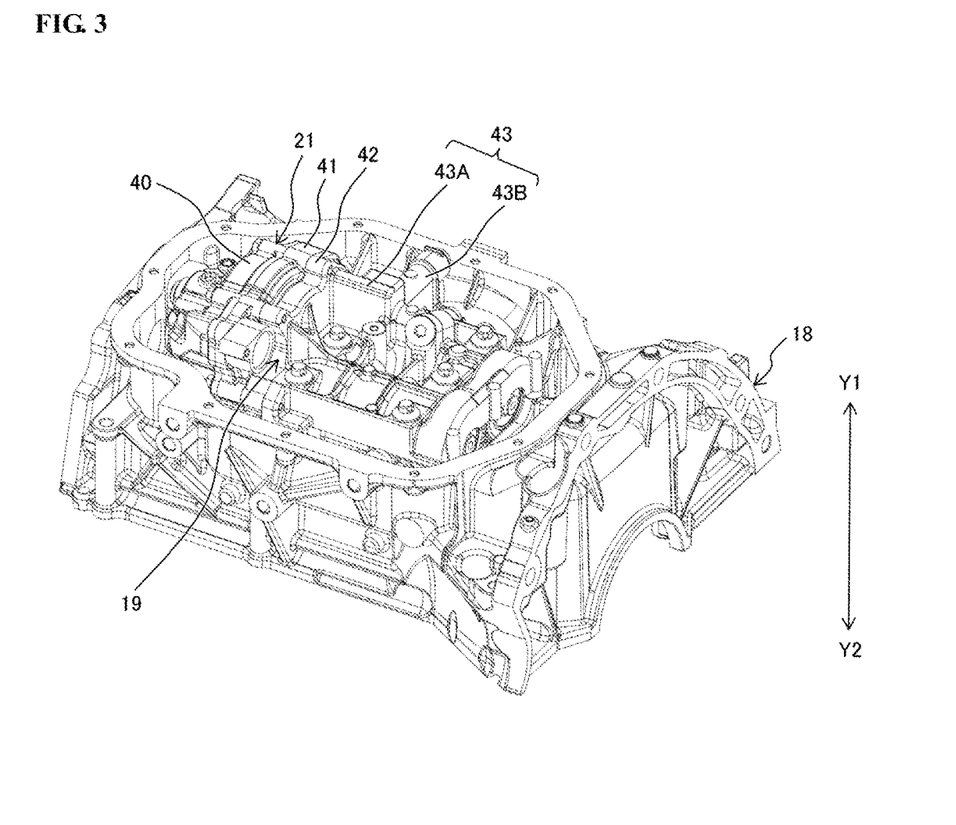
FIG. 3 is a perspective view of the balancer device assembled with a lower housing member and a crankcase (as an upper housing member) according to the one embodiment of the present invention, as viewed from the side of the lower housing member.
Figure 4:
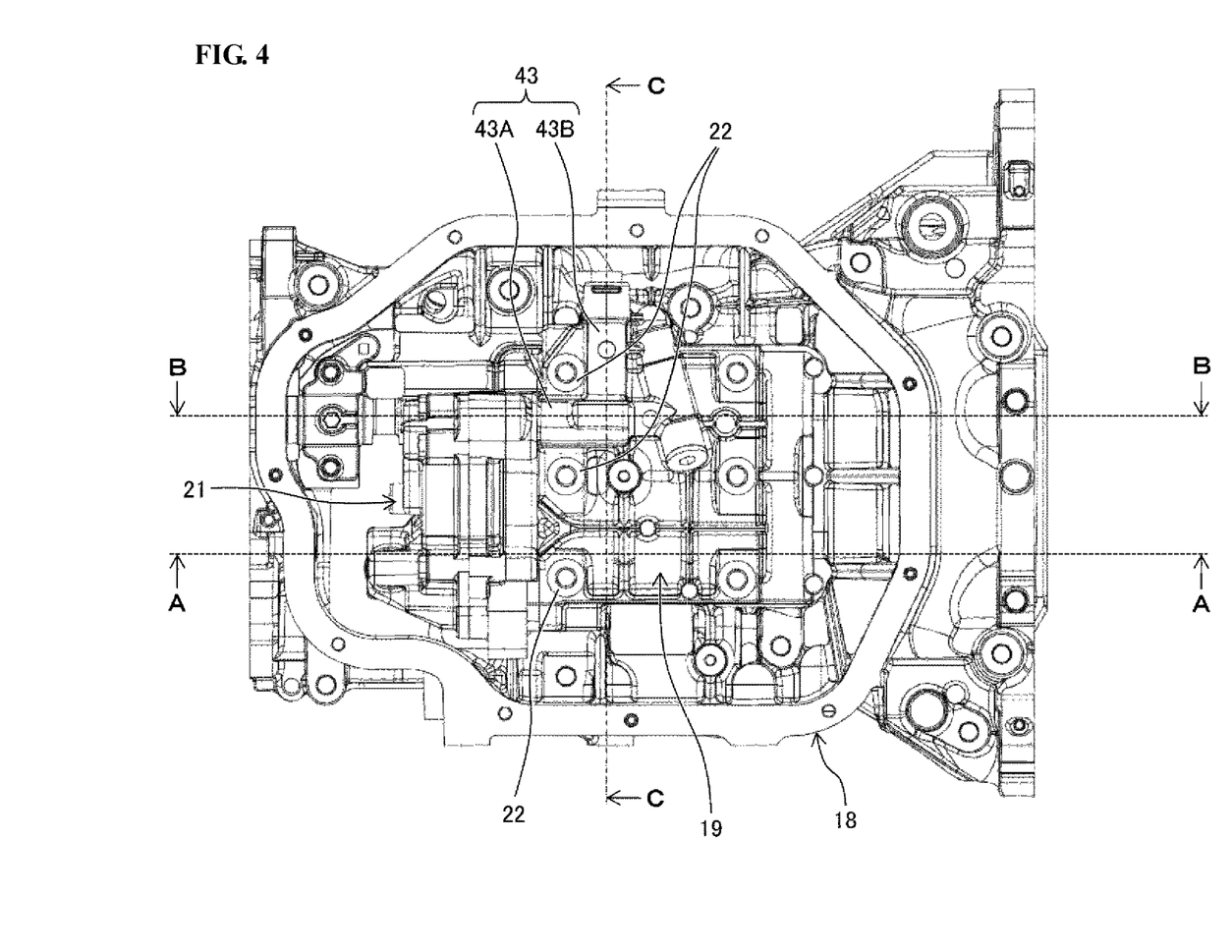
FIG. 4 is a bottom view of the balancer device according to the one embodiment of the present invention, as viewed from the lower housing member of FIG. 3.
Figure 5:
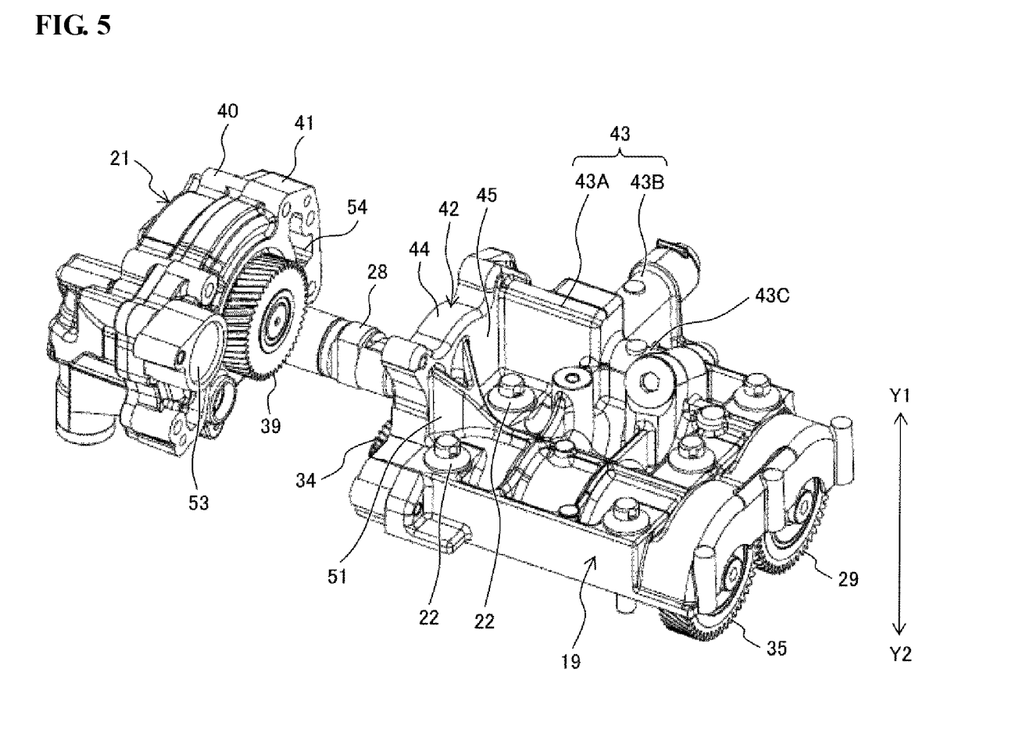
FIG. 5 is a perspective view of the balancer device, before the mounting of an oil pump, according to the one embodiment of the present invention.

Next, the specific constituent features of the present embodiment will be explained below. FIG. 3 is a perspective view showing the state of the crankcase 18, with the balancer device 17 assembled therein, as diagonally viewed from the side of the lower housing member 19. FIG. 4 is a bottom view showing the state of the crankcase 18 as viewed from the side of the lower housing member 19. FIG. 5 is a perspective view of the balancer body, as diagonally viewed from the side of the lower housing member 19, before mounting the oil pump 21 to the balancer device 17.

As shown in FIGS. 3 to 5, the balancer body 17 is placed on the lower side of the crankcase 18 in the gravity direction Y1; and the lower housing member 19 is attached to the lower surface of the crankcase 18 so as to cover the balancer body 17. The oil pump 21 is disposed adjacent to the rear end surface of the lower housing member 19 on one end side of the rotation axis of the first balancer shaft 28. The oil pump 21 is also placed on the lower side of the crankcase 18 in the gravity direction Y1. As mentioned above, the oil pump 21 is fixed to the lower housing member 19 by the fastening bolts 27 (see FIG. 2). It is herein noted that, in FIGS. 3 to 9, the upper and lower sides of the gravity direction Y1 are shown in reverse with respect to a vehicle mounted state for the purpose of illustrating the details of the respective parts.

The oil pump 21 includes a pump body 40, the pump cover 41 and the gear accommodation part 42 arranged in this order as viewed from the rear end side of the lower housing member 19, that is, one end side of the rotation axis of the balancer shaft. The pump body 40 has a trochoid pump unit to perform a pump action. More specifically, the trochoid pump unit includes an outer rotor having inner teeth formed with a trochoid curve profile on an inner circumferential surface thereof and an inner rotor having outer teeth formed with a trochoid curve profile on an outer circumferential surface thereof and held in mesh with the inner teeth of the outer rotor. The inner rotor is press-fitted to the rotation shaft of the oil pump 21 so as to receive a rotational force from the rotation shaft while being prevented from moving in a rotation direction of the rotation shaft and in a direction of the rotation shaft. The trochoid pump unit is covered by the pump cover 41 from the lateral side.

As shown in FIG. 5, the rotation shaft (not shown) with which the inner rotor of the trochoid pump unit rotates is inserted through a center portion of the pump cover 41. To this rotation shaft, the pump driving gear 39 is fixed. When a force is exerted on the pump driving gear 39 in the direction of the rotation shaft, such a force is transmitted to the inner rotor of the trochoid pump unit in the direction of the rotation shaft. Further, the pump driving gear 39 is in mesh with the reduction gear 34 as shown in FIG. 2. The pump driving gear 39 thus rotates with rotation of the second balancer shaft 33.

The oil pump 21 receives a rotational force from the second balancer shaft 33 as mentioned above. Since the second balancer shaft 33 rotates at a speed twice the rotation of the crankshaft, there is a possibility that cavitation occurs on the pump suction side when the oil pump 21 is driven by the rotation force transmitted from the second balancer shaft without through the reduction gear 34. In order to suppress the occurrence of such cavitation, the reduction gear 34 is used to reduce the rotation speed of the oil pump relative to the crankshaft. The reduction gear 34 may be provided on the first balancer shaft 28 rather than on the second balancer shaft 33.

The pump driving gear 39 and the reduction gear 34 are in mesh with each other. These gears 39 and 34 are accommodated in the gear accommodation part 42 formed on the end surface of the lower housing member 19. As will be explained in detail later, the gear accommodation part 42 is constituted by: the gear accommodating recessed part 44 formed on the end surface of the lower housing member 19 to accommodate therein the gears 39 and 34; and the pump cover 41 closing the gear accommodating recessed part 44. Herein, the gear accommodating recessed part 44 is formed by die casting integrally with the lower housing member 19 which is made of an aluminum alloy material. Further, the gear accommodating recessed part 44 also has the function of the "pump mounting fixing part" to which the pump cover 41 is fixed as mentioned above. Since the pump driving gear 39 and the reduction gear 34 are in the form of helical gears, the thrust force is exerted in the direction of the rotation shaft on not only the pump rotation shaft to which the pump driving gear 39 is integrally fixed but also the inner rotor. By contact of the end surface of the inner rotor with the pump cover 41, however, the pump rotation shaft and the inner rotor are prevented from moving in the direction of the rotation shaft.

Furthermore, a rigidity-reinforcing part 43 of predetermined width in which a discharge passage for the oil pump is defined is formed integrally on the outer lower side of the lower housing member 19 in the gravity direction Y1, at a position in the vicinity of the first balancer shaft 28, along the direction of extension (i.e. axis direction) of the first and second balancer shafts 28 and 33 so as to extend in parallel with the first and second balancer shafts 28 and 33 as shown in FIG. 5. This rigidity-reinforcing part 43 is also formed by die casting integrally with the lower housing member 19 of aluminum alloy material.

Consequently, both of the gear accommodating recessed part 44 constituting the gear accommodation part 42 and the rigidity-reinforcing part 43 are formed integrally with the lower housing member 44 by die casting. In the present embodiment, the gear accommodating recessed part 44 constituting the gear accommodation part 42 is also formed by die casting integrally with a sub rigidity-reinforcing part 51 which is a counterpart of the rigidity-reinforcing part 43. The sub rigidity-reinforcing part 51 is formed, at a location spaced from the rigidity-reinforcing part 43 and in the vicinity of the second balancer shaft 33, so as to extend in the same direction as the rigidity-reinforcing part 43. The sub rigidity-reinforcing part 51 has an end portion branched into two and integrated with the gear accommodating recessed part 44. In other words, the sub rigidity-reinforcing part 51 is formed integrally with the rigidity-reinforcing part 43 by die casting so as to extend in a Y-shape when viewed from the direction Y2 opposite to the gravity direction.

The gear accommodating recessed part 44 constituting the gear accommodation part 42 is reinforced from both sides by the rigidity-reinforcing part 43 and the sub rigidity-reinforcing part 51 so that, even when a vertical and/or lateral vibrating force is exerted on the pump section, such a vibrating force is received by the rigidity-reinforcing part 43 and the sub rigidity-reinforcing part 51.

Therefore, the balancer device 17 of the present embodiment maintains smooth mesh between the reduction gear 34 fixed to the second balancer shaft 33 of the balancer device 17 and the pump driving gear 39 fixed to the rotation shaft of the oil pump 21. Herein, the discharge passage of the rigidity-reinforcing part 43 is mostly formed by a die and finely shaped by a tool such as drill.

In the case where the rigidity-reinforcing part 43 provides a sufficient rigidity, the sub rigidity-reinforcing part 51 can be omitted. Further, the sub rigidity-reinforcing part 51 can be omitted by forming the rigidity-reinforcing part 43 on the lower surface of the lower housing member in the gravity direction Y1 at a location between the first balancer shaft 28 and the second balancer shaft 33. In such a case, it is necessary to make a design change, e.g., change the fixing position of the oil pump 21 or form the discharge passage along the gear accommodating recessed part 44, but is possible to renew the design as appropriate.

As shown in FIG. 4, the fixed surface of the lower housing member 19 is fastened to the bottom of the crankcase 18 by the plurality of fastening bolts 22, which are arranged across the first and second balancer shafts 28 and 33 in a direction perpendicular to the axes of the first and second balancer shafts 28 and 33. The rigidity-reinforcing part 43 and the sub rigidity-reinforcing part 51 are disposed between these fastening bolts 22.

The rigidity between the fastening bolts 22 is improved by the rigidity-reinforcing part 43 and the sub rigidity-reinforcing part 51 extending between the fastening bolts 22.

In the present embodiment, the rigidity-reinforcing part 43, which defines therein the oil discharge passage, is not formed in a radial direction perpendicular to the rotation axis of the first balancer shaft 28 and is formed along a direction of the rotation axis of the first balancer shaft 28. This prevents the oil pump 21 from becoming upsized in the radial outward direction.

The rigidity-reinforcing part 43 includes a first rigidity-reinforcing portion 43A and a second rigidity-reinforcing portion 43B in the present embodiment. The first rigidity-reinforcing portion 43A extends along the axis of the first balancer shaft 28 and turns at some point toward the second rigidity-reinforcing portion 43B. The second rigidity-reinforcing portion 43B then extends outwardly in the direction perpendicular to the axis of the first balancer shaft 28.

More specifically, the first rigidity-reinforcing portion 43A of the rigidity-reinforcing part 43 is shaped to turn at a position corresponding to the first balancer weight 32; and the second rigidity-reinforcing part 43B of the rigidity-reinforcing part 43 is shaped to cross over the first balancer weight 32 without interfering with the first balancer weight 32. The discharge passage is thus formed so as not to interfere with the first balancer weight 32.

Further, the first rigidity-reinforcing portion 43A extends to the vicinity of the first balancer weight 32; and the second rigidity-reinforcing portion 43 extends perpendicular to the first rigidity-reinforcing portion 43B. The rigidity of the lower housing member 19 is improved by these rigidity-reinforcing portions. This contributes to an improvement in rigidity with respect to the direction in which the lower housing member 19 is subjected to bending by rotations of the balancer weights 32 and 38.

The discharge passage defined in the first and second rigidity-reinforcing portions 43A and 43B and extending along the first and second rigidity-reinforcing portions 43A and 43B is connected to a discharge passage defined in the crankcase 18 so as to supply the oil through pipes (not shown) to various equipment and parts where lubrication or cooling is required. The configuration of the oil discharge passage will be explained in detail later.

In the present embodiment, a third rigidity-reinforcing portion 43C may be formed in the direction along the axis of the first balancer shaft 28, as in the case of the first rigidity-reinforcing portion 43A, as shown in FIG. 5. In this case, the discharge passage inside the third rigidity-reinforcing portion 43C is adapted to supply the oil to different equipment and parts from that inside the second rigidity-reinforcing portion 43B.

Figure 6:
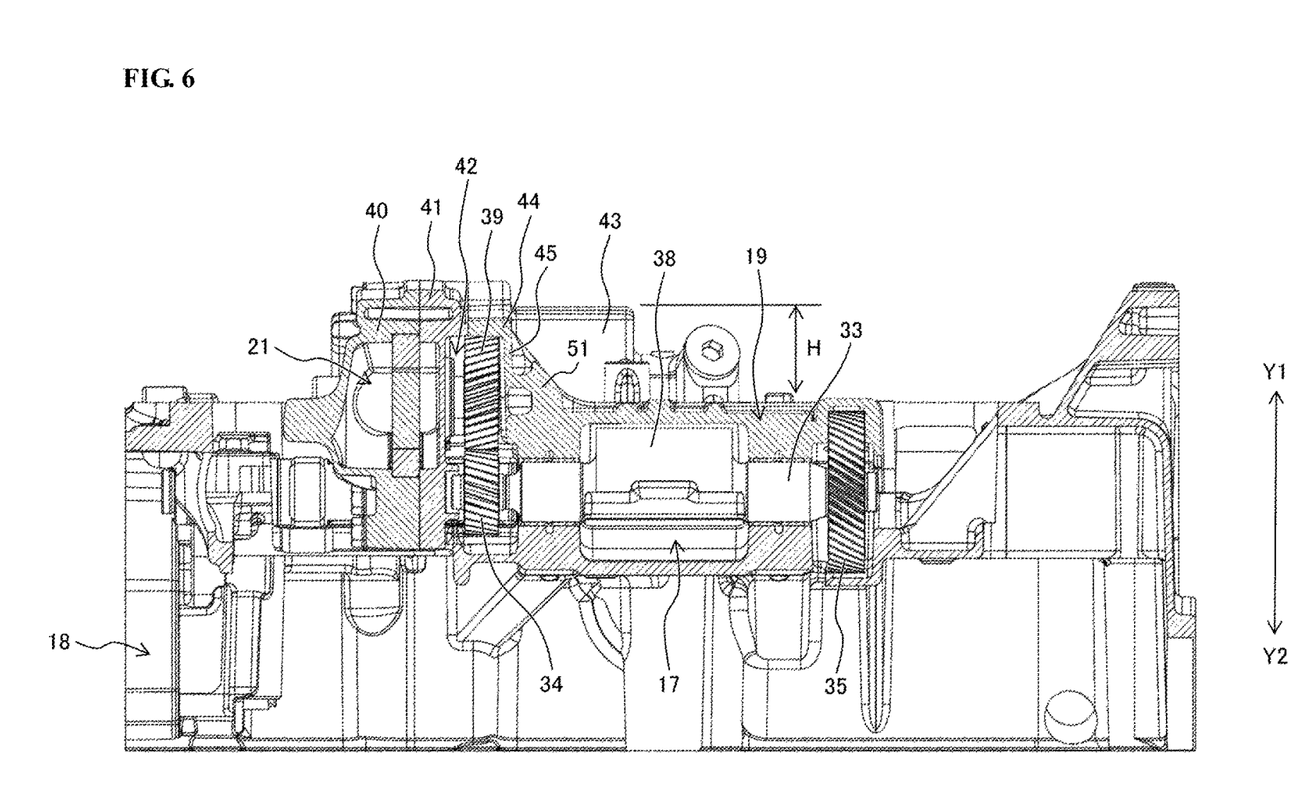
FIG. 6 is a cross-sectional view taken along line A-A of FIG. 4.
Figure 7:
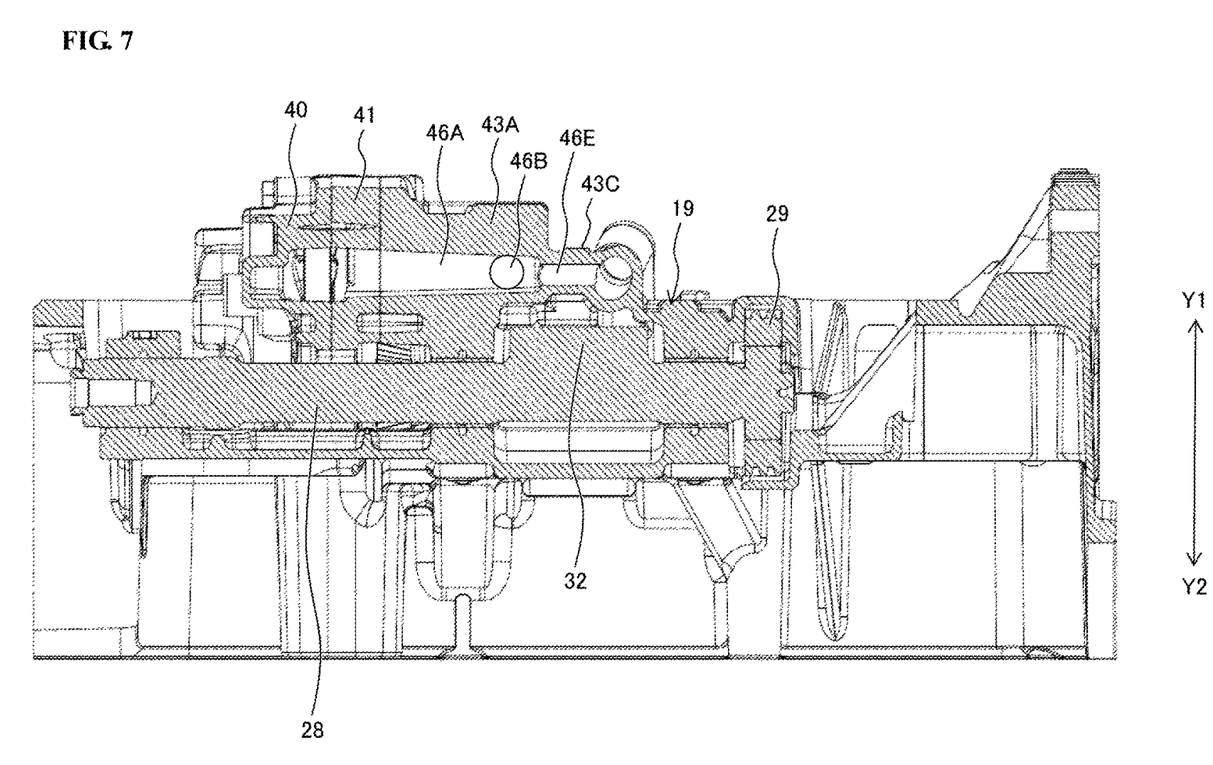
FIG. 7 is a cross-sectional view taken along line B-B of FIG. 4.

FIG. 6 is a cross-sectional view taken along line A-A of FIG. 4. FIG. 7 is a cross-sectional view taken along line A-A of FIG. 4. The cross-sectional structure of the balancer device will be explained below with reference to these figures. It is herein noted that FIGS. 6 and 7 are shown, with the lower housing member 19 facing upward, as in the case of FIG. 3. In the actual mounted state, the lower housing member 19 is located on the ground side (lower side) with respect to the gravity direction Y1.

FIG. 6 shows a cross section of the balancer device as seen in the direction of arrows A in FIG. 4 and as taken through the oil pump 21. In the following explanation, FIG. 5 should be referred to in combination with FIG. 6.

As shown in FIG. 6, the balancer body of the balancer device 17 is situated between the crankcase 18 and the lower housing member 19. The balancer device 17 includes: the second balancer weight 38 disposed midway on the second balancer shaft 33; the second transmission gear 35 disposed on one end side of the second balancer shaft 33; and the reduction gear 34 disposed on a side opposite from the second transmission gear 35. The reduction gear 34 is in mesh with the pump driving gear 39 of the oil pump 21 so that the rotation of the second balancer shaft 33 is reduced by the reduction gear 34 and transmitted to the pump driving gear 39.

As shown in FIGS. 5 and 6, the oil pump 21 has a trochoid pump structure surrounded by the pump body 40 and the pump cover 41. A suction port 53 (see FIG. 5) of the oil pump 21 is open toward the lower housing member 19 in the axis direction of the second balancer shaft 33. Similarly, a discharge port (see FIG. 5) of the oil pump 21 is open toward the lower housing member 19 in the axis direction of the first balancer shaft 28.

Further, the gear accommodation part 42 is provided between the pump cover 41 and the end surface of the lower housing member 19. The reduction gear 34 and the pump driving gear 35 are accommodated in the gear accommodation part 42. The oil pump 21 is fixed adjacently to the lower housing member 19 by the plurality of (in the present embodiment, five) fastening bolts 27.

The gear accommodating part 42 has a space defined by the gear accommodating recessed part 44 formed integral with the end surface of the lower housing member 19 and the pump cover 41 covering the gear accommodating recessed part 44, so that the reduction gear 34 and the pump driving gear 35 are placed in this space. As shown in FIGS. 5 and 6, the gear accommodating recessed part 44 is formed integrally on the end surface of the lower housing member 19 and has a flat surface portion 45 facing opposite the gear accommodation part 42. The rigidity-reinforcing part 43 and the sub rigidity-reinforcing part 51 are integrally formed including some areas of the flat surface portion 45. As already mentioned above, the gear accommodating recessed part 44 also has the function of the pump mounting fixing part.

The flat surface portion 45 of the gear accommodating recessed part 44 is formed as a surface region orthogonal to the rotation axes of the first and second balancer shafts 28 and 33. The rigidity-reinforcing part 43 and the sub rigidity-reinforcing part 51 are formed integrally with the flat surface portion 45 by die casting such that each of these rigidity-reinforcing parts 43 and 51 extend in a direction perpendicular to the flat surface portion 45 and away from the oil pump 21.

Although the shapes of the rigidity-reinforcing part 43 and the sub rigidity-reinforcing part 51 are arbitrary, the rigidity-reinforcing part 43 and the sub rigidity-reinforcing part 51 need to be shaped such that the gear accommodating recessed part 44 is reinforced by these rigidity-reinforcing parts and such that, when a force is exerted from the inner rotor onto the pump cover 41 in the rotation axis direction due to a vibration of the balancer weight and the helical gear configuration of the pump driving gear 39, the rigidity-reinforcing parts 43 and 51 receive such a force. In the present embodiment, for example, the sub rigidity-reinforcing part 51 is formed a slanted shape so as to decrease in width (height in FIG. 5) from the vicinity of an edge of the flat surface portion 45 toward the bottom of the lower housing member 19 as shown in FIG. 5.

On the other hand, it is preferable that, when viewed along the axis of the first balancer shaft 22, the rigidity-reinforcing part 43 is shaped to maintain a length (height) H that does not exceed a length (height) of projection of the oil pump 21 as shown in FIG. 6 because of the need to form the discharge passage in the rigidity-reinforcing part 43. Accordingly, the rigidity-reinforcing part 43 is formed in a "rectangular" side shape as seen in the direction of arrows A in the present embodiment. With this, the body construction of the balancer device is maintained even when the oil discharge passage is formed.

FIG. 7 shows a cross section of the balancer device as seen in the direction of arrows B in FIG. 4 and as taken through the rigidity-reinforcing part 43.

As shown in FIG. 7 as well as in FIG. 5, the first and second rigidity-reinforcing portions 43A and 43B are formed on the lower housing member 19 to which the oil pump 21 is located adjacent. A discharge passage 46A is formed in the first rigidity-reinforcing portion 43A along the rotation axis of the first balancer shaft 28. One end of the discharge passage 46A is connected to the discharge port 54 of the oil pump 21. The other end of the discharge passage 46A is connected to a discharge passage 46B formed in the second rigidity-reinforcing portion 43B. The other end of the discharge passage 46A is also connected to a discharge passage 46E formed in the third rigidity-reinforcing portion 43C in the present embodiment.

The first rigidity-reinforcing portion 43A of the rigidity-reinforcing part 43 is shaped to extend along the first balancer shaft 28 and then turn outward at a position corresponding to the first balancer weight 32 on the lower side of the lower housing member 19 in the gravity direction Y1. Further, the second rigidity-reinforcing portion 43B of the rigidity-reinforcing part 43 is shaped to cross over the first balancer weight 32 without interfering with the first balancer weight 32. In other words, the position of formation of the discharge passage 46A, 46B is outward of the outermost circumference of the first balancer weight 32 in the radial direction. The discharge passage 46A, 46B is thus formed without interfering with the first balancer weight 32.

Figure 8:
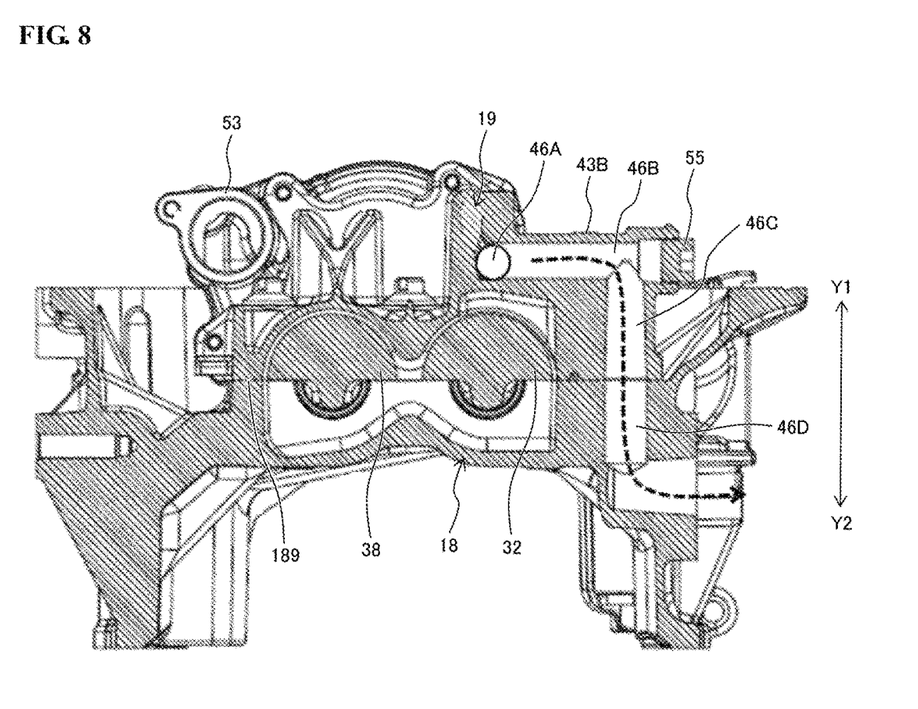
FIG. 8 is a cross-sectional view taken along line C-C of FIG. 4.

FIG. 8 shows a cross section of the balancer device as seen in the direction of arrows C in FIG. 4. The discharge passage 46B formed in the second rigidity-reinforcing portion 43B perpendicularly from the discharge passage 46A formed in the first rigidity-reinforcing portion 43A is connected to a discharge passage 46C formed in the lower housing member 19. The discharge passage 46C extends in a direction perpendicular to the discharge passage 46B and toward the fixed surface of the lower housing member to the crankcase 18.

Furthermore, the discharge passage 46C formed in the lower housing member 19 is directly connected to a discharge passage 46D formed in the crankcase 18, without using a connection passage such as pipe, in a state that the lower housing member 19 and the crankcase 18 are coupled together.

The discharge passage 46A of the first rigidity-reinforcing portion 43A and the discharge passage 46B of the second rigidity-reinforcing portion 43B are mostly formed by a die and then finely shaped by a tool such as drill. An opening of the discharge passage 46 of the second rigidity-reinforcing portion 43B is sealed by a sealing plug 55.

The discharge passage 46C formed in the lower housing member 19 and the discharge passage 46D formed in the crankcase 18 are thus brought into communication with each other without using a connection pipe etc. This contributes to downsizing of the balancer device 17. The oil discharged from the oil pump 21 is fed as indicated by an arrow and supplied to various equipment and parts where lubrication or cooling is required.

As explained above, the gear accommodating recessed part 44 to which the oil pump 21 is mounted is reinforced by the rigidity-reinforcing part 43 and the sub rigidity-reinforcing part 51 in the present embodiment so that, even when a vertical and/or lateral vibrating force is exerted on the oil pump 21 due to e.g. a vibration of the vehicle body or a vibration of the internal combustion engine, the rigidity-reinforcing parts 43 and 51 receives such a vibrating force. Particularly when a force is exerted from the inner rotor to the pump cover 41 in the rotation axis direction due to a vibration of the balancer weight and the helical gear configuration of the pump driving gear 39, the balancer device 17 maintains smooth mesh between the reduction gear 34 fixed to the second balancer shaft 33 of the balancer device 17 and the pump driving gear 39 fixed to the rotation shaft of the oil pump 21. This prevents an increase of gear mesh noise. Although the discharge passage is provided in the rigidity-reinforcing part 43 in the present embodiment, an intake passage may be provided in the rigidity-reinforcing part 43. Even in such a case, the balancer device maintains smooth mesh between the reduction gear 34 and the pump driving gear 39.

Further, the rigidity-reinforcing part 43, which defines therein the oil discharge passage, is not formed in the radial direction perpendicular to the axis direction of the first balancer shaft 28 and is formed along the axis direction of the first balancer shaft 28. This prevents upsizing of the oil pump 21 in the radial outward direction.

Next, a modified embodiment of the present invention will be described below with reference to FIG. 9. Although the gear accommodating recessed part 44 is formed on the end surface of the lower housing member 19 in the embodiment of FIG. 5, a gear accommodating recessed part 48 is formed on a pump cover 47 in the modified embodiment of FIG. 9.

Figure 9:
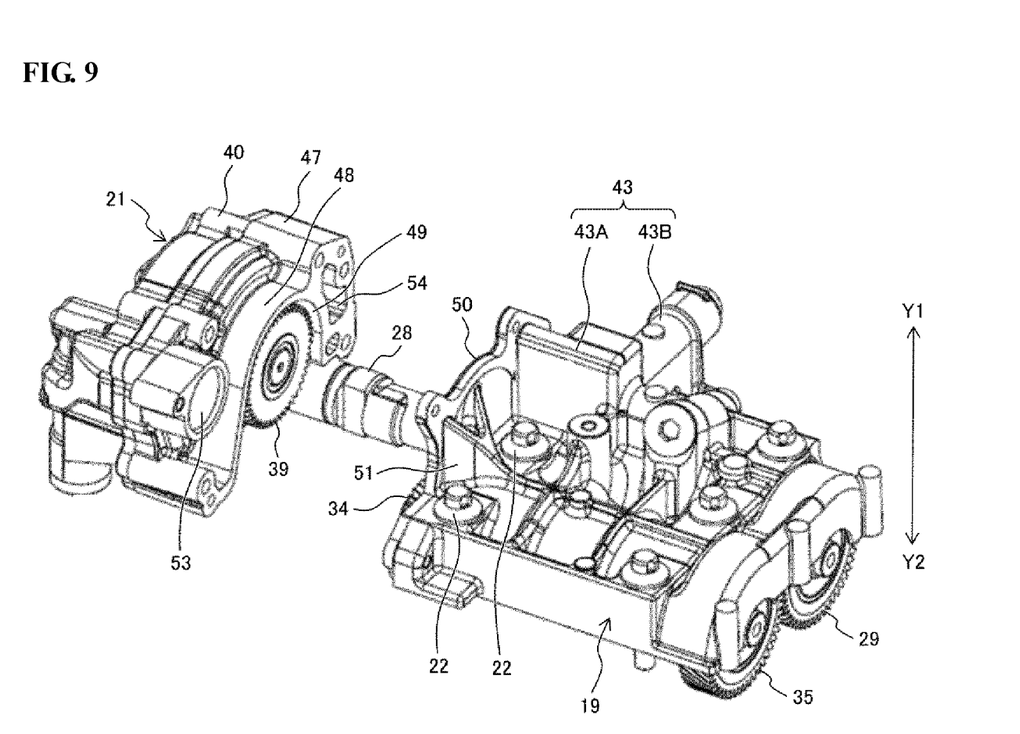
FIG. 9 is a perspective view of a balancer device, before the mounting of an oil pump, according to a modification of the one embodiment of the present invention.

As shown in FIG. 9, a gear accommodation part 49 is provided on the pump cover 47 so as to accommodate therein the reduction gear 34 and the pump driving gear 39. The gear accommodation part 49 is constituted by the gear accommodating recessed part 48 formed on the pump cover 47 and a flat surface portion 50 formed on the pump-side end surface of the lower housing member 19.

The gear accommodating recessed part 48 is covered by the flat surface portion 50. The flat surface portion 50 constitutes a portion of the gear accommodation part 49. In the present modified embodiment, the flat surface portion 50 formed integrally on the lower housing member 19 also has the function of a "pump mounting fixing part" to which the pump cover 47 of the oil pump 21 is fixed.

The gear accommodation part 49 has a space defined by the gear accommodating recessed part 48 formed integrally on the end surface of the pump cover 47 and the flat surface portion 50 formed on the end surface of the lower housing member 19 and covering the gear accommodating recess part 48 so that the reduction gear 34 and the pump driving gear 35 are placed in this space. The rigidity-reinforcing parts 43 and 51 are integrally connected to the flat surface portion 50 formed integrally on the end surface of the lower housing member 19

The flat surface portion 50 is formed as a plane area orthogonal to the rotation axes of the balancer shaft 33. The rigidity-reinforcing parts 43 and 51 are formed integrally with the flat surface portion 50 by die casting such that these rigidity-reinforcing parts extend in a direction perpendicular to the flat surface portion 50 and away from the oil pump 21. Although the height of the reinforcing part 43 is arbitrary, it is preferable that, when viewed in the axis direction of the balancer shaft 33, the rigidity-reinforcing part 43 is shaped to maintain a constant height that does not exceed a height of projection of the oil pump 21.

Even in the present modified embodiment, the rigidity-reinforcing part 43, which defines the oil discharge passage, is not formed in the radial direction perpendicular to the rotation axis of the balancer shaft 28, 33 and is formed along the axis direction of the balancer shaft 28, 33. This prevents upsizing of the oil pump 21 in the radial outward direction.

Furthermore, a portion of the gear accommodation part 49 (that is, the flat surface portion 50) is reinforced by the rigidity-reinforcing parts 43 and 51 so that, when a vertical and/or lateral vibrating force is exerted on the oil pump 21 due to a vibration of the balancer weight, a vibration of the vehicle body or a vibration of the internal combustion engine, the rigidity-reinforcing parts 43 and 51 receive such a vibrating force.

Even when a force is exerted from the inner rotor to the pump cover 47 in the rotation axis direction due to e.g. the helical gear configuration of the pump driving gear 68, the balancer device 17 maintains smooth mesh between the reduction gear 34 fixed to the second balancer shaft 33 of the balancer device 17 and the pump driving gear 39 fixed to the rotation shaft of the oil pump 21. This prevents an increase of gear mesh noise.

As described above, the balancer device according to the present invention is so configured that: the pump mounting fixing part to which the oil pump is fixed is formed on the end surface of the lower housing member; the gear accommodation part in which the pump driving gear and the reduction gear are accommodated is provided between the oil pump and the pump mounting fixing part; the rigidity-reinforcing part in which the oil discharge passage is defined in communication with the discharge port of the oil pump is formed on the lower housing member so as to extend in the direction of extension of the balancer shaft on the outer side of the lower housing member; and a portion of the pump mounting fixing part formed on the end surface of the lower housing member is made integral with the rigidity-reinforcing part.

In such a configuration, the rigidity-reinforcing part, which defines therein the oil discharge passage, is not formed in the radial direction perpendicular to the rotation axis of the balancer shaft and is formed along the axis direction of the balancer shaft. This prevents upsizing of the oil pump in the radial outward direction.

Furthermore, a portion of the pump mounting fixing part that constitutes the gear accommodation part is reinforced by the rigidity-reinforcing part so that, when a vertical and/or lateral vibrating force is exerted on the oil pump due to a vibration of the balancer weight, a vibration of the vehicle body or a vibration of the internal combustion engine, the rigidity-reinforcing part receives such a vibrating force.

As a consequence, the balancer device maintains smooth mesh between the reduction gear 34 fixed to the second balancer shaft 33 of the balancer device 17 and the pump driving gear 39 fixed to the rotation shaft of the oil pump 21 so as to thereby prevent an increase of gear mesh noise.

It should be understood that: the present invention is not limited to the above-described embodiments; and various changes and modifications of the above-described embodiments are possible. For example, the above-described embodiments are merely intended to facilitate understanding of the present invention. The present invention does not necessarily include all of the above-explained structural features. It is feasible to replace any of the structural features of one embodiment with those of the other embodiment or feasible to add any of the structural features of one embodiment to the other embodiment. One embodiment can be implemented by adding, deleting or replacing any of the structural features of the other embodiment. Moreover, the present invention is also applicable to a balancer device for a three-cylinder internal combustion engine. In this case, the balancer device is provided with a single balancer shaft.

For example, a balancer device for an internal combustion engine according to the following aspects of the present invention is possible in the light of the above-mentioned embodiments.

In accordance with one aspect of the present invention, there is provided a balancer device for an internal combustion engine, comprising: a first balancer shaft having mounting thereon a first transmission gear and a first balancer weight and to which a rotational force is transmitted from the internal combustion engine; a second balancer shaft having mounting thereon a second transmission gear in mesh with the first transmission gear, a reduction gear and a second balancer shaft; a housing accommodating therein at least portions of the first and second balancer shafts; an oil pump having a pump driving gear in mesh with the reduction gear and a pump body configured to discharge oil upon transmission of a rotational force from the pump driving gear; a pump mounting fixing part formed on the housing and to which the oil pump is fixed; and a rigidity-reinforcing part extending on an outer side of the housing in a direction of extension of the first and second balancer shafts and having a discharge passage defined therein in communication with the oil pump, the rigidity-reinforcing part being formed integrally with the housing including a portion of the pump mounting fixing part.

In accordance with a preferable aspect of the present invention, there is provided a balancer device for an internal combustion engine as described above, wherein the pump mounting fixing part is formed on an end surface of the housing and is provided with a gear accommodating recessed part in which the pump driving gear and the reduction gear are accommodated, and wherein the gear accommodating recessed part is covered by a pump cover of the oil pump in a state that the pump driving gear and the reduction gear are accommodated in the gear accommodating recessed part.

In accordance with another preferable aspect of the present invention, there is provided a balancer device for an internal combustion engine as described above, wherein an pump cover of the oil pump has is provided with a gear accommodating recessed part in which the pump driving gear and the reduction gear are accommodated, wherein the pump mounting fixing part is formed on an end surface of the housing, and wherein the gear accommodating recessed part is covered by a flat surface portion of the pump mounting fixing part in a state that the pump driving gear and the reduction gear are accommodated in the gear accommodating recessed part.

In accordance with another preferable aspect of the present invention, there is provided a balancer device for an internal combustion engine as described above, wherein the rigidity-reinforcing part is formed on the outer side of the housing at a location in the vicinity of the first balancer shaft.

In accordance with another preferable aspect of the present invention, there is provided a balancer device for an internal combustion engine as described above, wherein the rigidity-reinforcing part formed on the housing comprises a first rigidity-reinforcing portion extending to the vicinity of the first balancer weight in an axis direction of the first balancer shaft.

In accordance with another preferable aspect of the present invention, there is provided a balancer device for an internal combustion engine as described above, wherein the rigidity-reinforcing part formed on the housing further comprises a second rigidity-reinforcing portion turned and extending from the first rigidity-reinforcing portion in a direction perpendicular to the axis direction of the first balancer shaft.

In accordance with another preferable aspect of the present invention, there is provided a balancer device for an internal combustion engine as described above, wherein the first rigidity-reinforcing portion has a first discharge passage defined therein and connected to a discharge port of the oil pump, wherein the second rigidity-reinforcing portion has a second discharge passage defined therein along the direction perpendicular to the axis direction of the first balancer shaft and connected to the first discharge passage, and wherein an opening of the second discharge passage is sealed by a sealing plug.

In accordance with another preferable aspect of the present invention, there is provided a balancer device for an internal combustion engine as described above, wherein the housing comprises a lower housing member fixed to a crankcase of the internal combustion engine, and wherein the second discharge passage defined in the second rigidity-reinforcing portion is directly connected through a third discharge passage defined in the lower housing member to a fourth discharge passage defined in the crankcase.

In accordance with another preferable aspect of the present invention, there is provided a balancer device for an internal combustion engine as described above, wherein the housing comprises a lower housing member fastened to a crankcase of the internal combustion engine by a plurality of fastening bolts, wherein the plurality of fastening bolts are arranged across the first and second balancer shafts in a direction perpendicular to axis directions of the first and second balancer shafts, and wherein the rigidity-reinforcing part is disposed between the plurality of fastening bolts.

In accordance with another preferable aspect of the present invention, there is provided a balancer device for an internal combustion engine as described above, wherein the balancer device further comprises a second rigidity-reinforcing member extending in the same direction as and spaced from the first-mentioned rigidity-reinforcing part in which the discharge passage is defined and having no discharge passage defined therein, wherein the pump mounting fixing part formed on the end surface of the housing is made integral with the first-mentioned rigidity-reinforcing part and the second rigidity-reinforcing part, and wherein the second rigidity-reinforcing part is formed on the outer side of the housing at a location in the vicinity of the second balancer shaft.

In accordance with another preferable aspect of the present invention, there is provided a balancer device for an internal combustion engine as described above, wherein the housing comprises a lower housing member fastened to a crankcase of the internal combustion engine by a plurality of fastening bolts, wherein the plurality of fastening bolts are arranged across the first and second balancer shafts in a direction perpendicular to axis directions of the first and second balancer shafts, and wherein the first-mentioned rigidity-reinforcing part and the second rigidity-reinforcing part are disposed between the plurality of fastening bolts.

A balancer device for an internal combustion engine according to the following aspect of the present invention is also possible in the light of the above-mentioned embodiments.

In accordance with another one aspect of the present invention, there is provided a balancer device for an internal combustion engine, comprising: a balancer shaft having mounted thereon a reduction gear and a balancer weight, the reduction gear being configured to rotationally drive a pump driving gear of an oil pump; a lower housing member accommodating therein at least a portion of the balancer shaft including the balancer weight; a pump mounting fixing part formed on an end surface of the lower housing member and to which the oil pump is fixed; a gear accommodation part provided between the oil pump and the pump mounting fixing part and accommodating therein the pump driving gear of the oil pump and the reduction gear; and a rigidity-reinforcing part extending on an outer side of the lower housing member in a direction of extension of the balancer shaft and having a discharge passage defined therein in communication with a discharge port of the oil pump, the rigidity-reinforcing part being formed integrally with the lower housing member including a portion of the pump mounting fixing part formed on the end surface of the lower housing member.

The invention claimed is:

1. A balancer device for an internal combustion engine, comprising:
    a first balancer shaft having mounting thereon a first transmission gear and a first balancer weight and to which a rotational force is transmitted from the internal combustion engine;
    a second balancer shaft having mounting thereon a second transmission gear in mesh with the first transmission gear, a reduction gear and a second balancer weight;
    a housing accommodating therein at least portions of the first and second balancer shafts;
    an oil pump having a pump driving gear in mesh with the reduction gear and a pump body configured to discharge oil upon transmission of a rotational force from the pump driving gear;
    a pump mounting fixing part formed on the housing and having a surface to which the oil pump is fixed;
    a gear accommodation part accommodating therein the pump driving gear, the pump mounting fixing part being formed so as to include a portion of the gear accommodation part; and
    a first rigidity-reinforcing part extending on an outer side of the housing in a direction of extension of the first and second balancer shafts and having defined therein a discharge passage connected to and opened to a discharge port of the oil pump,
    the first rigidity-reinforcing part being formed integrally with the housing including a portion of the pump mounting fixing part opposite from the surface to which the oil pump is fixed in the direction of extension of the first and second balancer shafts.

2. The balancer device for the internal combustion engine according to claim 1,
    wherein the gear accommodation part is provided with a gear accommodating recessed part in which the pump driving gear and the reduction gear are accommodated, and
    wherein the gear accommodating recessed part is covered by a pump cover of the oil pump in a state that the pump driving gear and the reduction gear are accommodated in the gear accommodating recessed part.

3. The balancer device for the internal combustion engine according to claim 2,
    wherein the first rigidity-reinforcing part is formed on the outer side of the housing at a location in the vicinity of the first balancer shaft.

4. The balancer device for the internal combustion engine according to claim 3,
    wherein the balancer device further comprises a second rigidity-reinforcing member extending in the same direction as and spaced from the first rigidity-reinforcing part in which the discharge passage is defined and having no discharge passage defined therein,
    wherein the pump mounting fixing part formed on the end surface of the housing is made integral with the first rigidity-reinforcing part and the second rigidity-reinforcing part, and
    wherein the second rigidity-reinforcing part is formed on the outer side of the housing at a location in the vicinity of the second balancer shaft.

5. The balancer device for the internal combustion engine according to claim 4,
    wherein the housing comprises a lower housing member fastened to a crankcase of the internal combustion engine by a plurality of fastening bolts, wherein the plurality of fastening bolts are arranged across the first and second balancer shafts in a direction perpendicular to axis directions of the first and second balancer shafts, and wherein the first rigidity-reinforcing part and the second rigidity-reinforcing part are disposed between the plurality of fastening bolts.

6. The balancer device for the internal combustion engine according to claim 1, wherein a pump cover of the oil pump is provided with a gear accommodating recessed part in which the pump driving gear and the reduction gear are accommodated, wherein the pump mounting fixing part is formed on an end surface of the housing, and wherein the gear accommodating recessed part is covered by a flat surface portion of the pump mounting fixing part in a state that the pump driving gear and the reduction gear are accommodated in the gear accommodating recessed part.

7. The balancer device for the internal combustion engine according to claim 1, wherein the first rigidity-reinforcing part formed on the housing comprises a first rigidity-reinforcing portion extending to the vicinity of the first balancer weight in an axis direction of the first balancer shaft.

8. The balancer device for the internal combustion engine according to claim 7, wherein the first rigidity-reinforcing part formed on the housing further comprises a second rigidity-reinforcing portion turned and extending from the first rigidity-reinforcing portion in a direction perpendicular to the axis direction of the first balancer shaft.

9. The balancer device for the internal combustion engine according to claim 8, wherein the first rigidity-reinforcing portion has a first discharge passage defined therein and connected to the discharge port of the oil pump, wherein the second rigidity-reinforcing portion has a second discharge passage defined therein along the direction perpendicular to the axis direction of the first balancer shaft and connected to the first discharge passage, and wherein an opening of the second discharge passage is sealed by a sealing plug.

10. The balancer device for the internal combustion engine according to claim 9, wherein the housing comprises a lower housing member fixed to a crankcase of the internal combustion engine, and wherein the second discharge passage defined in the second rigidity-reinforcing portion is directly connected through a third discharge passage defined in the lower housing member to a fourth discharge passage defined in the crankcase.

11. The balancer device for the internal combustion engine according to claim 1, wherein the housing comprises a lower housing member fastened to a crankcase of the internal combustion engine by a plurality of fastening bolts, wherein the plurality of fastening bolts are arranged across the first and second balancer shafts in a direction perpendicular to axis directions of the first and second balancer shafts, and wherein the first rigidity-reinforcing part is disposed between the plurality of fastening bolts.

12. A balancer device for an internal combustion engine, comprising:

a balancer shaft having mounted thereon a reduction gear and a balancer weight, the reduction gear being configured to rotationally drive a pump driving gear of an oil pump;

a lower housing member accommodating therein at least a portion of the balancer shaft including the balancer weight;

a pump mounting fixing part formed on an end surface of the lower housing member and having a surface to which the oil pump is fixed;

a gear accommodation part provided between the oil pump and the pump mounting fixing part and accommodating therein the pump driving gear of the oil pump and the reduction gear, the pump mounting fixing part being formed so as to include a portion of the gear accommodation part; and a rigidity-reinforcing part extending on an outer side of the lower housing member in a direction of extension of the balancer shaft and having a discharge passage defined therein in communication with a discharge port of the oil pump, the rigidity-reinforcing part being formed integrally with the lower housing member including a portion of the pump mounting fixing part opposite from the surface to which the oil pump is fixed.

* * * * *